United States Patent [19]
Gurnell et al.

[11] Patent Number: 4,725,884
[45] Date of Patent: Feb. 16, 1988

[54] OPTICAL METROLOGY
[75] Inventors: Andrew W. Gurnell, Clifton; Keith Horner, Haxby; Richard R. Jackson, York, all of England
[73] Assignee: Vickers PLC, London, England
[21] Appl. No.: 864,789
[22] Filed: May 19, 1986
[30] Foreign Application Priority Data
  May 20, 1985 [GB] United Kingdom ............... 8512727
[51] Int. Cl.4 .................. H04N 7/00; H04N 7/18
[52] U.S. Cl. .................. 358/107; 358/101; 356/384
[58] Field of Search .......... 358/101, 107; 364/550, 364/560–563; 356/378, 384–387; 250/561
[56] References Cited
  U.S. PATENT DOCUMENTS
  4,287,532  9/1981  Moore ................... 358/107
  4,499,383  2/1985  Loose ................... 356/384

Primary Examiner—Howard W. Britton
Assistant Examiner—John K. Peng
Attorney, Agent, or Firm—Wood, Dalton, Phillips, Mason & Rowe

[57] ABSTRACT

A method and apparatus for measuring the width of a small object between a pair of opposed edges thereof e.g. the width of a line on a semiconductor wafer, having a light microscope, a video system for receiving an optical image from the microscope and for displaying the image on a display surface having a reference datum, and an optical system for transmitting the optical image from the light microscope to the video system. In order to measure the width of the line of the wafer, relative adjustment is carried out between the optical system and the object to a first measuring position in which the image is moved across the display surface until a predetermined intensity level of one of the edges of the line is brought to a predetermined position relative to the reference datum. Further relative adjustment is then carried out to a second measuring position in which a further predetermined intensity level of the other edge of the object is brought to a predetermined position relative to the reference datum. The extent of adjustment movement is then measured, so as to provide a value which corresponds with the width of the object to be measured between the opposed edges thereof. The reference datum will be positioned on a detecting surface at a position where substantially distortion-free images can be produced i.e. remote from the edges of the screen, and then the images are moved relative to this datum, so an accurate inspection can be carried out.

10 Claims, 9 Drawing Figures

FROZEN IMAGE

FEATURE MARKERS

VIDEO LINES

INTENSITY PROFILES

AVERAGE PROFILES

OPTICAL METROLOGY

This invention relates generally to optical metrology, and is particularly concerned with a measuring method and apparatus for automatically measuring the dimensions of small objects under a light microscope.

The type of objects with which the invention is particularly, though not exclusively concerned is products used in the semiconductor industry, in which it is necessary to measure the widths of lines on photomasks and semiconductor wafers, and in the manufacture of magnetic recording heads in which it is required to measure the width of the gap in a magnetic circuit.

BACKGROUND INFORMATION

Existing instruments for automatic micromeasurement normally employ either video scanning or photometric slit scanning techniques. The video scanning technique suffers from non-linearities inevitably present in the scanning of a television camera tube, whereas the photometric slit scanning technique suffers from the disadvantage of being slow in operation.

The present invention has therefore been developed primarily, though not exclusively, with a view to providing a micromeasurement method and apparatus that is faster in operation than the photometric slit scanning technique, and yet which overcomes the potential inaccuracies of the existing video scanning technique.

SUMMARY OF THE INVENTION

According to a first aspect of the invention there is provided a method of measuring the width of a small object between a pair of opposed edges thereof, such as the width of a line on a semi-conductor wafer, using a light microscope, a video system for receiving an optical image from the light microscope and for displaying the image on a display surface having a reference datum, and an optical system for transmitting the optical image from the light microscope to the video system, the method comprising:

carrying out relative adjustment between the optical system and the object to a first measuring position in which the image is moved across the display surface until a predetermined intensity level of one of said edges is brought to a predetermined position relative to the reference datum;

carrying out further relative adjustment to a second measuring position in which a further predetermined intensity level of the other edge of the object is brought to a predetermined position relative to the reference datum; and measuring the extent of adjustment between the first and second measuring positions to provide a value which corresponds with the width of the object to be measured between said opposed edges thereof.

According to a second aspect of invention there is provided apparatus for measuring the width of a small object between a pair of opposed edges thereof, such as the width of a line on a semi-conductor wafer, the apparatus comprising:

a light microscope for viewing the object;

a video system for receiving an optical image from the light microscope and for displaying the image on a display surface having a reference datum;

an optical system for transmitting the optical image from the light microscope to the video system;

means for causing relative adjustment between the optical system and the object to a first measuring position in which the image is moved acros the display surface until a predetermined intensity level of one of said edges is brought to a predetermined position relative to the reference datum, and subsequently to a second measuring position in which a further predetermined intensity level of the other edge of the object is brought to a predetermined position relative to the reference datum; and means for measuring the extent of adjustment between the first and second measuring positions to provide a value which corresponds with the width of the object to be measured between said opposed edges thereof.

Preferably, the relative adjustment is carried out by moving the optical system so as to move the image between the first and second measuring positions, while the object remains fixed. However, it is within the scope of the invention for the optical system to remain fixed while controlled accurate adjustment movement is imparted to the object in order to move the image between the first and second measuring positions.

In a preferred arrangement, in which the optical system is movable, the optical system comprises a reflective surface which is adjusted so as to carry out the necessary movement of the image between the first and second measuring positions.

The reflective surface may be formed by a mirror which is angular adjustable. However, other types of optical system may be employed, not having a reflective surface. For example, the optical system may comprise an opto-electronic system which is electrically controlled in order to switch the direction of a path of light through the system by an amount sufficient to achieve movement of the image between the first and second measuring positions.

Preferably, the reference datum is a reference line, and this will be situated on a region e.g. a mid-region of a detecting surface e.g. a camera tube target where distortion to the measured image applied thereon is less than other positions on the detecting surface.

The predetermined intensity level which is monitored may be the same for each edge, though this is not essential. The intensity levels which are monitored may be via so-called "minimum thresholds", "inside thresholding", "outside thresholding", or "double thresholding", as will be known to those of ordinary skill in the art.

When the reflective surface is formed by a mirror, it may be mounted for angularly adjustable movement between its measuring positions, and preferably is arranged to be driven by a precision scanning motor e.g. a limited angle torque motor (LATM), having a transducer which monitors the angular displacement of the motor.

The video system may comprise a television camera tube which is arranged in the path of the optical image transmitted by the reflective surface, though other video system arrangements may be provided, as desired, which can convert an optical image of an object into electrical signals, and then display the object on a display surface, such as a TV monitor screen, for viewing by an operative.

As will be described in detail below with reference to the drawings, there is disclosed herein a measuring method and apparatus for measuring the width of a small object between a pair of opposed edges thereof, such as the width of a line on a semiconductor wafer, and comprising a light microscope for viewing the object, a video system for receiving an optical image from the light microscope and for displaying the image on a display surface having a reference datum, and an optical system surface arranged to transmit the optical image from the light microscope to the video system. Preferably, the optical system comprises a reflective surface which is arranged to be adjustable to a first measuring position in which the image is moved across the display surface until a predetermined intensity level of one of the opposed edges is brought to a predetermined position relative to the reference datum, and subsequently is adjustable to a second measuring position in which a further predetermined intensity level of the other edge is brought to a predetermined position relative to the reference datum. By providing means for measuring the extent of adjustment of the reflective surface from the first to the second measuring position, a value can be obtained which corresponds with the width of the object between the opposed edges thereof.

DESCRIPTION OF PREFERRED EMBODIMENTS

Figure 1:
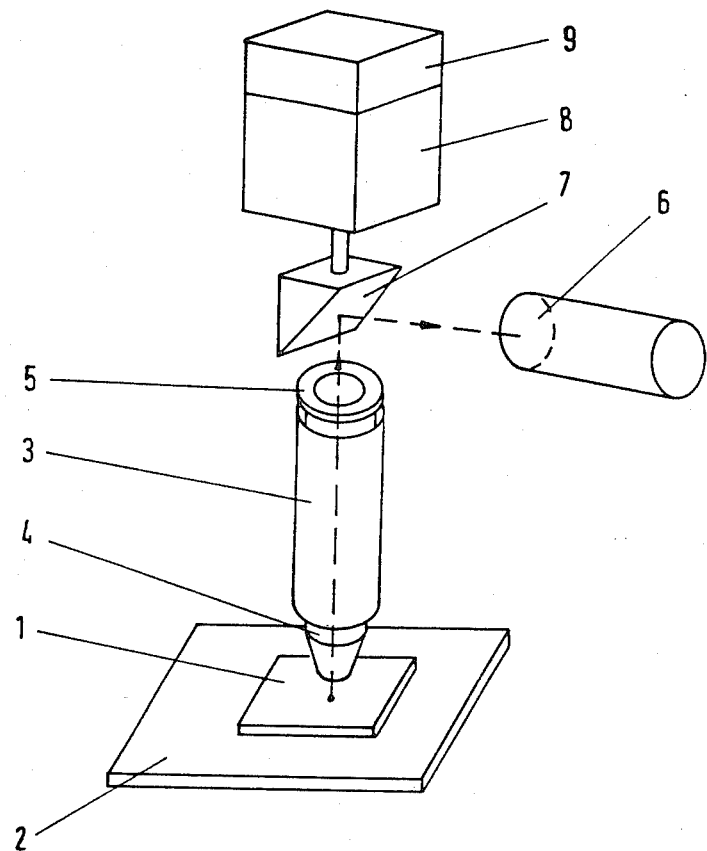
FIG. 1 is a schematic illustration of measuring apparatus according to the invention for automatically measuring the dimensions of small objects.

Referring now to FIG. 1, the apparatus according to the invention is shown schematically and comprises a light microscope 3 having a movable stage 2 on which a specimen 1 is placed and which carries the object to be measured, such as a semiconductor wafer. A video system, taking the form of a television camera tube having a detecting surface 6, is arranged to receive an optical image from the light microscope 3. The optical image is obtained by focusing the microscope objective 4 on the object. An adjustable reflective surface is formed by an angularly adjustable mirror 7, taking the form of a prism in FIG. 1 by way of example only, which is arranged to transmit the optical image from the light microscope 3 via eyepiece 5 onto the detecting surface 6 of the television camera. The reflective surface or mirror 7 is mounted on the shaft of a precision scanning motor 8 which is fitted with a transducer 9 for monitoring the angular displacement of the shaft of the motor 8 during movement of the mirror 7 between its measuring positions. The transducer 9 may, for example, be a capacitive device.

While an adjustable mirror 7 is shown, other types of adjustable reflective surface may be used. In addition, other types of adjustable optical systems may be used, not having a reflective surface. For example, an electro-optical system may be used (not shown) which is electrically controlled to operate in a similar way to e.g. to move the image on a video screen between the required measuring positions. This may be achieved by providing an optical device which alters the path of a light image through the device, in response to applications of an electrical signal onto the device, so as to achieve the required movement of the image.

Figure 2:
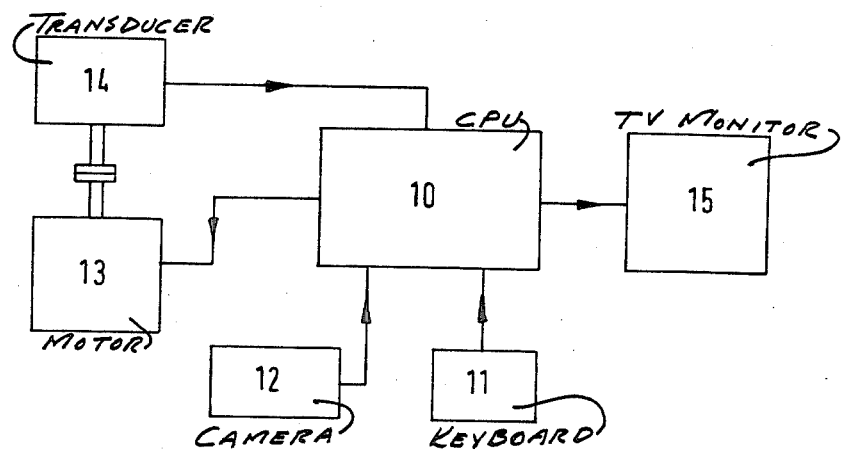
FIG. 2 is a block diagram illustrating the automatic electrical control over the operation of the apparatus.

Referring now to FIG. 2, this shows a block diagram of a means of connecting the scanner motor 8, the position transducer 9 and the television camera (6) into a control and measuring system. A central processing unit (CPU) 10 is supplied with command signals from a keypad 11 and with a television video signal from television camera 12 (indicated schematically by reference 6 in FIG. 1). The CPU controls a scanner motor 13 (equivalent to motor 8 in FIG. 1) and receives information on the position of the scanner motor armature from a displacement transducer 14 (equivalent to transducer 9 in FIG. 1) which is mechanically coupled to the scanner motor 13. The CPU also feeds a television monitor 15 which has a display surface presenting an image of the object under the microscope, as well as measurement information.

As indicated above, during measurement of the width of an object having opposed edges, the reflective surface (7) is adjusted to a first measuring position in which the image is moved across the display surface until a predetermined intensity level of one of the edges is brought to a predetermined position relative to the reference datum e.g. on a reference datum line, the reflective surface is then adjusted to a second measuring position in which a further predetermined intensity level of the other edge is brought to a predetermined position relative to the reference datum, e.g. also preferably on a reference datum line, and then the extent of adjustment of the reflective surface from the first to the second measuring position is measured to provide a value which corresponds with the width of the object between the opposed edges thereof.

The measurement steps, and particularly the determining of the intensity levels of the images will now be described in more detail with reference to FIGS. 3a to 3e.

The measurement technique used is a shear scanning technique which overcomes potential inaccuracies in other measuring techniques, and which has high measurement repeatability. (SHEARSCAN in the trade name of a measurement technique developed by the VICKERS INSTRUMENTS DIVISION of VICKERS PLC). The technique relies on using a narrow vertical band at the centre of the camera tube as the only measurement position. This avoids any non-linear portions of the tube and the need for frequent camera calibration. Selected points on the intensity profile are brought to the measurement position by movement of the scanning mirror (7) which is driven by a high accuracy DC servo motor. The motor rotation required to drive the scanning mirror and bring each side of the image to the measurement position can be used to calculate the feature size.

To illustrate a typical sequence of events, consider how the technique follows a Process Engineer's program to make a simple automatic line width measurement at 50% intensity. The sequence is described in the following four steps:

1. INITIAL ESTIMATE 9 (see FIG. 3a)

The frame store 1 image is frozen to contain the image to be measured. The portion of the frozen image enclosed between the feature markers is then used to provide an initial estimate of feature size for use in a subsequently described step (step 4).

2. AVERAGE INTENSITY PROFILE (see FIG. 3b)

An intensity profile of the marked feature is calculated, based on the average intensity for points at the same position on each tube line. This overcomes minor variations in line width which the Process Engineer considers insignificant. (However the technique is capable of measuring even very small anomalies, but for convenience a simple line width measurement only will be considered).

3. REQUIRED MEASUREMENT INTENSITY (see FIG. 3c)

The Process Engineer would have selected the intensity at which the measurement is to be made when writing his program which, in the present case, is 50%.

4. THE MEASUREMENT STEPS (see FIG. 3d)

The measurement of the feature is now made in two steps. Firstly, the distance is measured between points of "steepest slope" on the intensity profile. This gives a basic dimension which can then be fine tuned to input any correction for the Process Engineer's chosen intensity.

FIRST MEASUREMENT STEP

Main CPU (10) directs the mirror to drive until the Left Steepest Slope Point is at the measurement position on the camera tube. Then, using the estimated feature size from step 1, Main CPU directs the mirror to rotate a specific amount to bring the Right Steepest Slope Point approximately to the measurement position. This estimated position is checked and corrected on command of the main CPU to bring the Right Steepest Slope Point precisely to the measurement position.

Since the mirror rotation is accurately calibrated for each magnification, the dimension across points of steepest slope is now known from the mirror rotation required to scan these points across the camera measurement position.

Figure 3A:
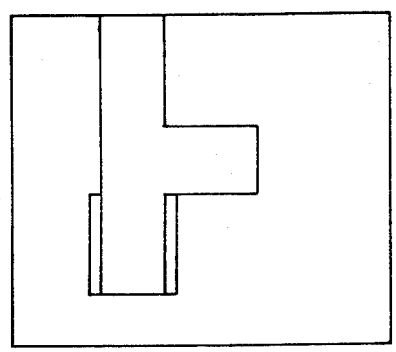
FIGS. 3a to 3e are diagrammatic illustrations of the process steps involved in carrying out a measuring method using the apparatus.
Figure 3B:
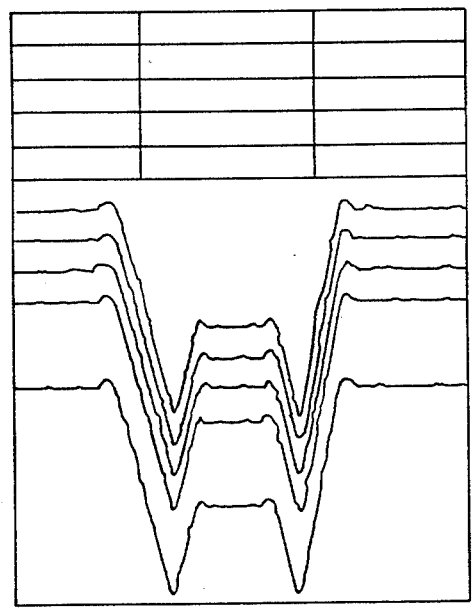
Figure 3C:
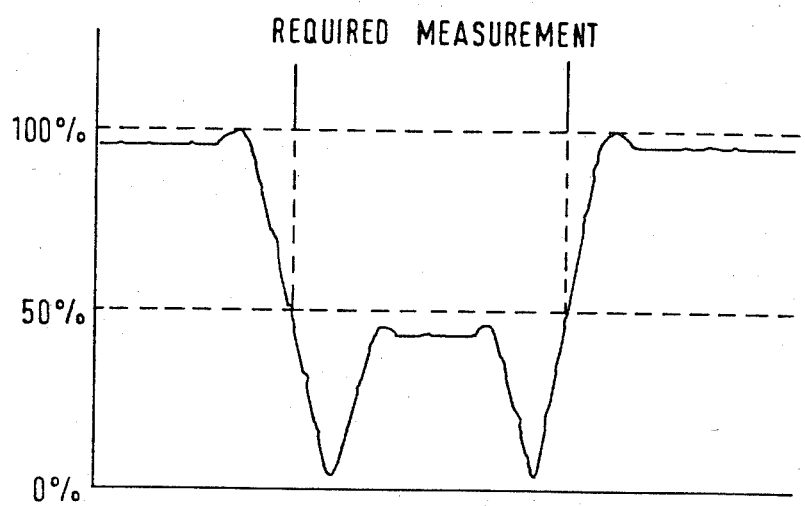
Figure 3D:
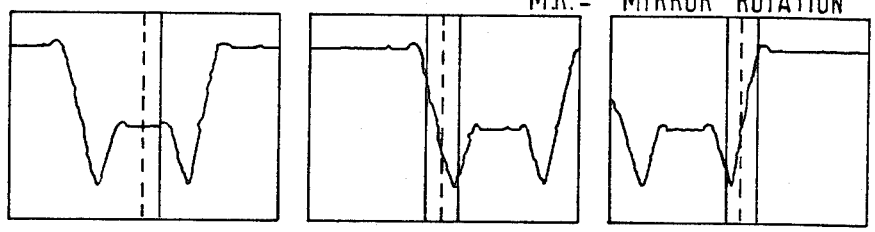
Figure 3E:
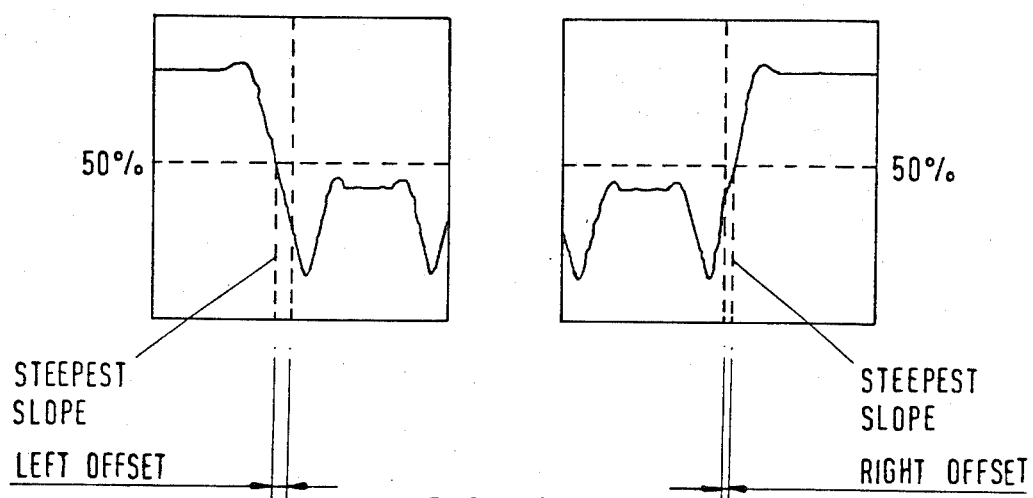

SECOND MEASUREMENT STEP (see FIG. 3e)

Next there must be added any corrections required for measurement at the chosen intensity (50% in this case).

The offset for the chosen intensity are calculated direct from the camera image as each edge stops at the measurement position. This is done by calculating the horizontal displacement of the 50% points from the Steepest Slope points in video pixels. The pixels are then converted to Microns using the conversion factors in machine memory.

The 50% offsets are added to (or subtracted from) the Steepest Slope dimension to give the total dimension from Left 50% point to Right 50% point. This dimension can then be displayed as the final measurement on the monitor screen.

It should be understood that the above figures and described process steps are given for illustration purpose only.

Figure 4:
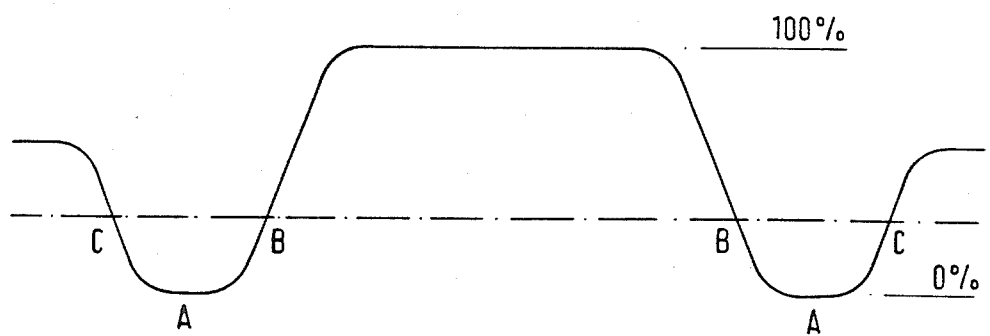
FIG. 4 is a diagram of methods of monitoring different samples of intensity thresholds of line image-edges of an object to be measured.

Referring now to FIG. 4, this is a diagram of different methods of sampling intensity thresholds of the edge to edge image. The first method monitors the "minimum thresholds" between points A—A. The second method monitors the "inside thresholds" between points B—B, and the third method monitors the "outside thresholds" between points C—C. (The second and third methods monitor at the predetermined threshold value shown by dash-dot line in FIG. 4). So-called "double thresholding" is obtained by monitoring the distance between the average C-B positions, which will be close to minimum thresholding between points A—A.

For small feature measurement i.e. 1 micron or less, the profile may not always be entirely clear, and it is necessary to choose the best measurement method.

Figure 5:
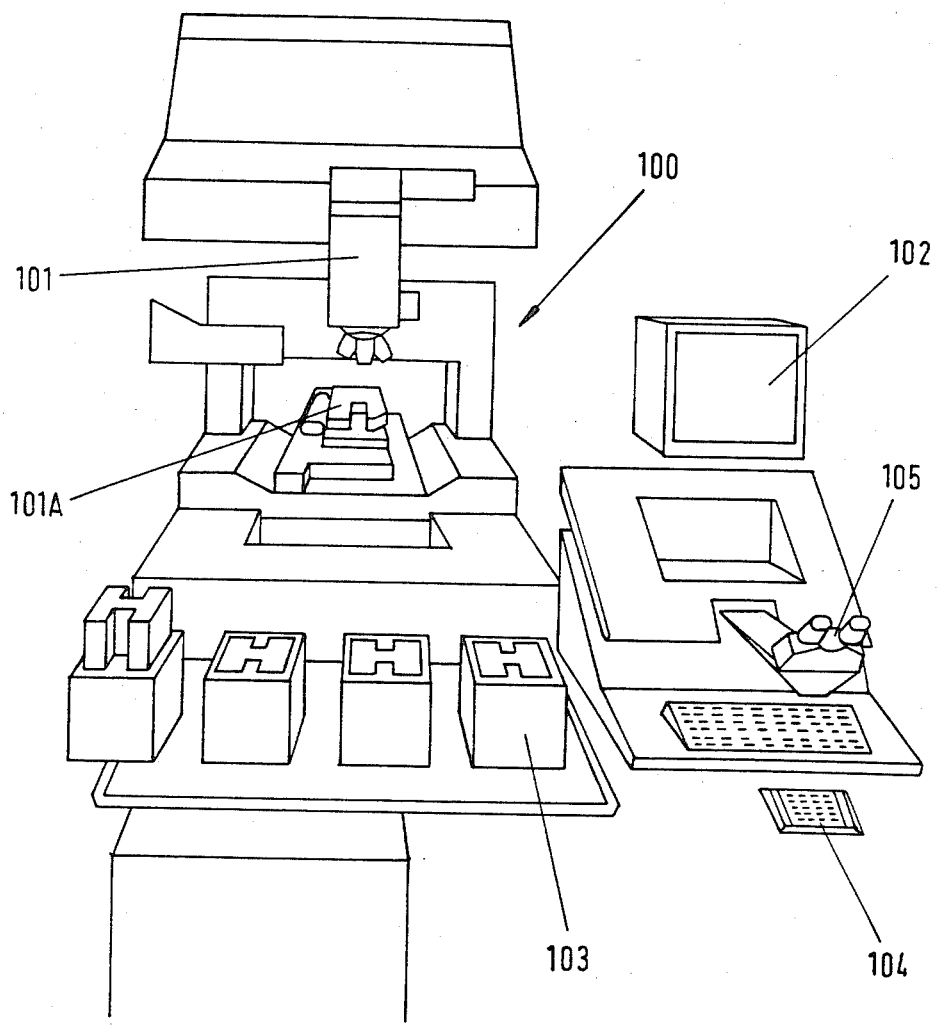
FIG. 5 is a schematic illustration of apparatus according to the invention.

FIG. 5 of the drawings is a schematic and partly exploded illustration of apparatus according to the invention which is designated generally by reference 100, and which comprises a light microscope 101, a T.V. screen 102, a set of magazines 103 capable of carrying a stack of wafers which are moved automatically and individually to a stage 101A below the microscope objective, an operator keypad 104, a binocular viewing system 105 and a close circuit television camera (not shown) coupled with the microscope 101.

We claim:

1. A method of measuring the width between a pair of opposed edges of a feature on one of a semi-conductor wafer and a photomask, using a light microscope, a video system including a detecting surface having a fixed reference datum, for receiving an optical image of the feature from the light microscope, and an optical system for t ansmitting the optical image from the light microscope to the video system, the method comprising:

carrying out relative adjustment between the optical system and the feature to a first measuring position, in which adjustment the image is move across the detecting surface until a point in the image representing one of said edges and having a predetermined intensity level is brought to a predetermined position position relative to tbe reference datum;

carrying out further relative adjustment to a second measuring position, in which adjustment a point in the image representing he other of said edges and having a predetermined intensity level is brought to said a predetermined position relative to the reference datum; and measuring the extent of adjustment between the first and second measuring positions to provide a value which corresponds with the width of the feature to be measured between said opposed edges thereof.

2. The method according to claim 1, in which the relative adjustment is carried out by moving the optical system so as to move the image across the detecting surface between the first and second measuring positions, while the feature remains fixed.

3. The method according to claim 1, in which the optical system remains fixed while controlled accurate adjustment movement is impalated to the object in order to move the image across the detecting surface between the first and second measuring positions.

4. An apparatus for measuring the width between a pair of opposed edges of a feature on one of a semiconductor wafer and a photomask, the apparatus comprising:

a light microscope or viewing the object;

a video system comprising a detecting surface having a fixed reference datum, for receiving an optical image from the light microscope;

an optical system for transmitting the optical image from the light microscope to the video system;

means for causing relative adjustment between the optical system and the feature to a first measuring position in which a point in the image representing one of said edges and having a predetermined intensity level is brought to a predetermined position relative to the reference datum, and subsequently to a second measuring position in which a point in the image representing the other of said edges and having a predetermined intensity level is brought to said predetermined position relative to the refererce datum; and means for measuring the extent of adjustment between the first and second measuring positions to provide a value which corresponds with the width of the feature to be measured between said opposed edges thereof.

5. The apparatus according to claim 4, in which the optical system comprises an opto-electronic system, and wherein means are provided for electrically controlling the opto-electronic system in order to switch the direction of a path of light through the system by an amount sufficient to achieve movement of the image between the first and second measuring positions.

6. The apparatus according to claim 4, in which the video system further comprises a display surface for displaying the received optical image.

7. The apparatus according to claim 4, in which the detecting surface of the video system is provided by a television camera tube arranged in the path of the optical image transmitted by the optical system.

8. The apparatus according to claim 4, in which the optical system comprises a reflective surface, and wherein means are provided for adjusting said reflective surface so as to carry out the necessary movement of the image between the first and second measuring positions.

9. The apparatus according to claim 8, in which the reflective surface comprises an angularly adjustable mirror.

10. The apparatus according to claim 9, including a precision scanning motor arranged to drive the angularly adjustable mirror, and a transducer arranged to monitor the angular displacement of the mirror.

* * * * *